United States Patent
Dasgupta

(10) Patent No.: US 11,199,436 B2
(45) Date of Patent: Dec. 14, 2021

(54) METHOD AND A SYSTEM FOR CONFIGURING AN ELECTROMAGNETIC FLOWMETER

(71) Applicant: ABB Schweiz AG, Baden (CH)

(72) Inventor: Subhashish Dasgupta, Bangalore (IN)

(73) Assignee: ABB Schweiz AG, Baden (CH)

( * ) Notice: Subject to any disclaimer, the term of this patent is extended or adjusted under 35 U.S.C. 154(b) by 115 days.

(21) Appl. No.: 16/612,267

(22) PCT Filed: Aug. 7, 2017

(86) PCT No.: PCT/IB2017/054819
§ 371 (c)(1),
(2) Date: Nov. 8, 2019

(87) PCT Pub. No.: WO2018/207009
PCT Pub. Date: Nov. 15, 2018

(65) Prior Publication Data
US 2020/0173836 A1 Jun. 4, 2020

(30) Foreign Application Priority Data
May 11, 2017 (IN) .............................. 201741016525

(51) Int. Cl.
*G01F 25/00* (2006.01)
*G01F 1/58* (2006.01)

(52) U.S. Cl.
CPC .......... *G01F 25/0007* (2013.01); *G01F 1/584* (2013.01); *G01F 1/586* (2013.01)

(58) Field of Classification Search
CPC ...... G01F 25/0007; G01F 1/584; G01F 1/586; G01F 15/02; G01F 1/58
See application file for complete search history.

(56) References Cited

U.S. PATENT DOCUMENTS

| 2010/0107776 A1 | 5/2010 | Shanahan |
| 2012/0125124 A1 | 5/2012 | Hays et al. |
| 2015/0022181 A1* | 1/2015 | Anderson ................ G01R 1/30 324/114 |
| 2015/0127275 A1 | 5/2015 | Thomas et al. |

OTHER PUBLICATIONS

PCT International Search Report & Written Opinion for PCT/IB2017/054819, dated Feb. 13, 2018, 11 pages.

* cited by examiner

*Primary Examiner* — Herbert K Roberts
*Assistant Examiner* — John M Royston
(74) *Attorney, Agent, or Firm* — Leydig, Voit & Mayer, Ltd.

(57) ABSTRACT

The present invention relates to a method of configuring an electromagnetic flowmeter and an electromagnetic flowmeter thereof. The method comprises: obtaining a first correlation factor between flow rate of fluid and potential for a calibrated condition of the electromagnetic flowmeter using a model; obtaining a second correlation factor between flow rate of fluid and potential for conditions of a site in which the electromagnetic flowmeter is installed using the model; comparing the first correlation factor and the second correlation factor to determine a difference in value and adopting the value of the second correlation factor for configuring the electromagnetic flowmeter if the difference in value exceeds a pre-set threshold.

10 Claims, 4 Drawing Sheets

METHOD AND A SYSTEM FOR CONFIGURING AN ELECTROMAGNETIC FLOWMETER

CROSS-REFERENCE TO RELATED APPLICATIONS

This application is a national stage entry under 35 U.S.C. § 371 of PCT International Stage Patent Application No. PCT/IB2017/054819, filed Aug. 7, 2017, which claims priority to Indian Patent Application No. 201741016525, filed May 11, 2017. The entire disclosures of the foregoing applications are incorporated herein by reference.

FIELD OF THE INVENTION

The present invention relates generally to an electromagnetic flowmeter and more particularly to a method and a system for configuring an electromagnetic flowmeter as per conditions of a site in which the electromagnetic flowmeter is installed.

BACKGROUND OF THE INVENTION

Measurement of flow of fluids through a conduit or pipe can be done by numerous ways like using electromagnetic flowmeters.

A typical electromagnetic flowmeter works on Faraday's law of electromagnetic induction. An electromagnetic field is imposed within a flow pipe having a flow of fluid with a certain level of conductivity. Electromotive force (EMF) induced as a result of the interaction of the electromagnetic field with fluid molecules (ions in the fluid), is measured using electrodes provided at the pipe side walls. The measured EMF is proportional to the flowrate and thus used to measure flowrate. While electromagnetic flowmeters are attractive given that they are accurate and simplistic in construction, conditions of the site where the electromagnetic flowmeter is installed is also important in ensuring correct measurement of the flow rate of fluid flowing in the electromagnetic flowmeter.

An electromagnetic flowmeter may be installed at a site with different conditions of installation specific to the site. A condition like a bend, valve, reducer etc. in the pipe upstream of the flowmeter can cause a disturbance in the fluid flowing to the electromagnetic flowmeter. In other words upstream disturbances alter the calibration factor of the electromagnetic flowmeter, from the value obtained under standard lab conditions (during the calibration procedure). Downstream disturbances have little effect on the measurement values of the electromagnetic flowmeter, which however cannot be neglected.

The effect of upstream flow profile disturbances, on measurement accuracy have been encountered in electromagnetic flowmeters. A current practice to overcome this is to use a fluid flow straightener or an obstacle designed to modify flow and hence to induce flow profile uniformity. However, such features can cause pressure drop, have manufacturability issues and could suffer corrosion/erosion depending on fluid temperature and/or composition. Also, flow profile disturbances could be of several types due to several types of upstream disturbances (e.g. Disturbance due to a bend, disturbance due to a valve etc.). It is a challenge to design a universal flow conditioner for all such disturbances.

Hence there is a need for a method of configuring the electromagnetic flowmeter that can provide correct measurement of the flow rate of fluid under different types of flow conditions like bend, valve, reducer, etc. and also such that during the installation of the electromagnetic flowmeter itself corrective action can be taken and the error can be adjusted.

SUMMARY

The above-mentioned shortcomings, disadvantages and problems are addressed herein which will be understood by reading and understanding the following specification.

In one aspect, the present invention provides a method of configuring an electromagnetic flowmeter for measuring a flow of fluid in a flow pipe, the electromagnetic flowmeter comprising one or more computing device for configuring the electromagnetic flowmeter, at least one coil for generating electromagnetic fields that interact with the fluid passing through the flow pipe, a pair of potential sensing electrodes for measuring electromotive forces generated by the interaction of electromagnetic fields in the fluid, the method comprising the steps of: obtaining a first correlation factor between a value of flow rate of the fluid flowing in the flow pipe and a value of potential generated between a pair of electrodes for the fluid flowing in the flow pipe for a calibrated condition of the electromagnetic flowmeter using a model; obtaining a second correlation factor between a value of flow rate of the fluid flowing in the flow pipe and a value of potential generated between a pair of electrodes for the fluid flowing in the flow pipe of the electromagnetic flowmeter based on one or more conditions of a site in which the electromagnetic flowmeter is installed using the model; comparing the first correlation factor and the second correlation factor to determine a difference in value between the first correlation factor and the second correlation factor; and adopting at least one of the value of the first correlation factor or the value of the second correlation factor for configuring the electromagnetic flowmeter based on the difference in value between the first correlation factor and the second correlation factor.

In an embodiment the difference in value is compared to a preset threshold for adopting at least one value of the first correlation factor or the second correlation factor.

In an embodiment the one or more conditions of the site are at least one of level of current flowing in the at least one coil, number of turns in the coil, one or more dimension of the electromagnetic flowmeter, orientation of bend, presence of valve, presence of reducers, presence of an obstruction to flow of fluid.

In an embodiment the first correlation factor is based on an assumed value of flow rate of the fluid flowing in the flow pipe and a value of potential generated between a pair of electrodes for a calibrated condition of the electromagnetic flowmeter.

In an embodiment the first correlation factor is a based on a measured value of flow rate of the fluid flowing in the flow pipe and a value of potential generated between a pair of electrodes for a calibrated condition of the electromagnetic flowmeter.

In an embodiment the pre-set value is almost equal to zero.

In an aspect the present invention provides a system for configuring an electromagnetic flowmeter comprising: one or more computing units communicatively coupled with the electromagnetic flowmeter and a model of the electromagnetic flowmeter device deployed with one or more computing units for, computing a first correlation factor relating a value of flow rate of fluid and a value of potential difference generated between electrodes in the model of the electromagnetic flowmeter using one or more condition information as used during calibration of the electromagnetic flowmeter, and a second correlation factor relating a value of flow rate of fluid and a value of potential difference generated between electrodes in the model of the electromagnetic flowmeter using one or more conditions of a site for installation of the electromagnetic flowmeter; and for adopting one of the first correlation factor and the second correlation factor based on significance of difference between the first correlation factor and the second correlation factor for configuring the electromagnetic flowmeter.

In an embodiment, the one or more computing units is located within the electromagnetic flowmeter device.

In an embodiment, the one or more computing units is located remote to the electromagnetic flowmeter device.

In an embodiment, the computing unit comprises at least one comparator for comparing the first correlation factor and the second correlation factor to determine significance of difference between the first correlation factor and the second correlation factor using a pre-set threshold.

DETAILED DESCRIPTION

Figure 1:
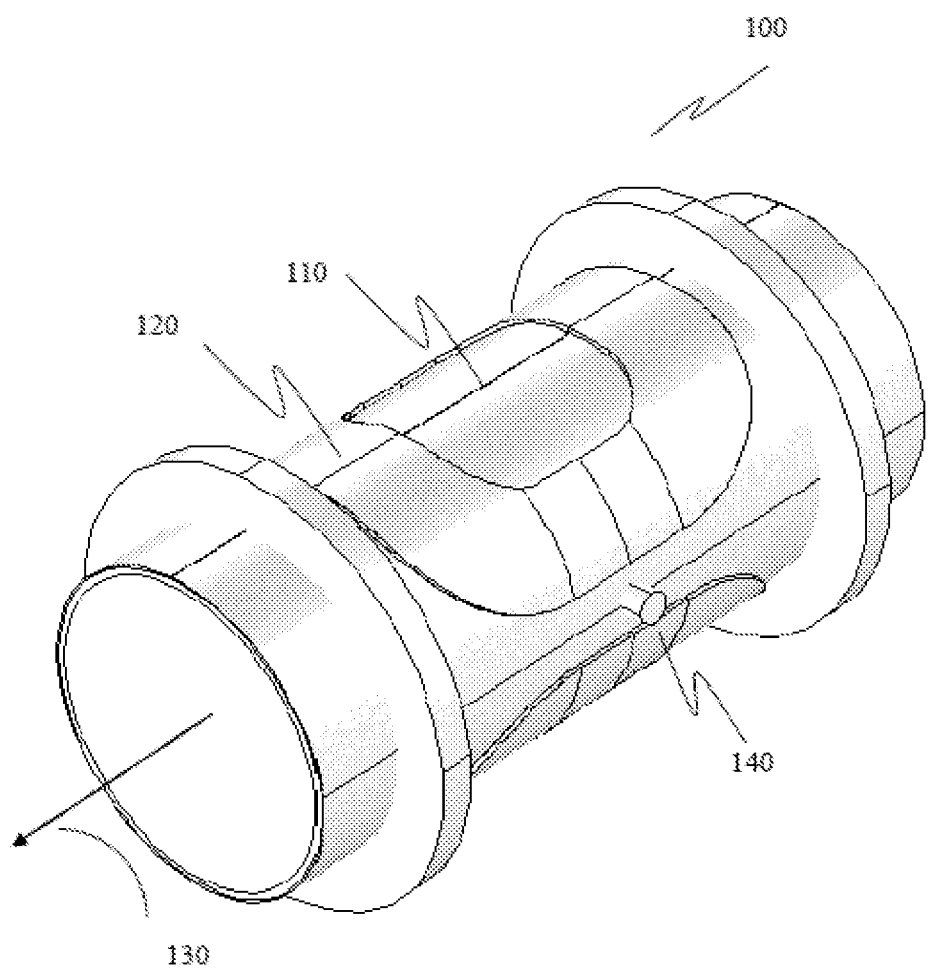
FIG. 1 shows an electromagnetic flowmeter for measuring a flow of fluid in a flow pipe.

The present invention is related to a method of configuring an electromagnetic flowmeter for measuring flow of fluid in a flow pipe. The present invention provides a method of configuring an electromagnetic flowmeter under various conditions of installation of the electromagnetic flowmeter in a site. Flow profile may undergo a deviation from a normal profile under the influence of a bend in a pipe or presence of a valve or a reducer. In an exemplary scenario, an electromagnetic flowmeter may be installed close to a bend which may cause distortion in a flow profile of the fluid passing through the electromagnetic flowmeter. In such a condition, the electromagnetic flowmeter may provide an erroneous value of measurement of the flow rate of the fluid flowing in the flow pipe since the electromagnetic flowmeter is calibrated for measurement under standard or normal conditions of flow of fluid. Under such conditions, the present invention uses a model based on Finite Element analysis for electromagnetics and coupled with Computational Flow Dynamics (CFD) module to provide correct measurement of the flow rate of the fluid.

The main outcome of the model used in the present invention is a correlation factor or calibration factor or sensitivity, which is induced EMF divided by the velocity or flow rate of fluid. The primary input to the model is the coil current/no. of turns, the velocity or flow rate of fluid and the flowmeter/piping dimensions and shape, which are all available from various sources like piping diagrams etc. Upstream and/or downstream features like bends, valves, reducers etc. are also used as inputs to the model.

The present invention uses the model during the installation phase of the electromagnetic flowmeter in the site. On receiving the required inputs, the model generates an altered (adopted) correlation factor for the particular upstream disturbance condition. Disturbance features may also be downstream. If the altered correlation factor is not the same as the correlation factor calculated under standard conditions the altered correlation factor is incorporated in a signal processor of the electromagnetic flowmeter.

The model used by the present invention is a parametric model, with a configurable interface, which can mimic any flow disturbing feature. For example, the model can mimic a bend at any distance from the flowmeter and oriented at any angle to the horizontal and vertical planes. Advanced communication systems like blue tooth technology or cloud computing technology could be used, to facilitate the to and fro communication between the electromagnetic flowmeter installed at the site and the model. The model has the capability of calculating pressure, temperature and stresses within the electromagnetic flowmeter as well as piping at a downstream level. This also ensures reliability of existing sensors.

The model used by the present invention also reduces number of sensors used along the pipe. The model has capability of calculating stresses and pressure on pipe/flowmeter walls, and provides early indication of possible failure and leakage. Model has the capability of calculating temperature within the electromagnetic flowmeter, in case of hot liquids and predicts thermal problems. Additionally, modification to existing pipe systems like incorporation of a valve can be done without having to re-calibrate the electromagnetic flowmeter using costly and time-consuming experiments.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be adapted. The following detailed description is, therefore, not to be taken in a limiting sense.

FIG. 1 shows an electromagnetic flowmeter 100, which comprises a conduit/flow pipe 110 through which fluid flows, a coil 120 excited electrically by an excitation unit (not shown) for generating electromagnetic fields that interact with the fluid passing through the conduit/flow pipe where 130 indicates the direction of flow of the fluid, a pair of electrodes (140—referencing an electrode shown in the figure, 150 referencing an electrode not visible in the figure but present at the opposite side of the conduit/flow pipe facing the electrode 140).

The flowing fluid passes through the conduit 110 in the electromagnetic flowmeter. The coil is provided above the conduit 110, as shown in figure 100, and once the coils are electrically excited, they generate an electromagnetic field that traverses the conduit 110 volume. As will be known to the persons skilled in the art, the coil can be of different shapes depending on the need for magnetic field intensity. Interaction of the magnetic flux and the moving fluid, causes a potential difference (Faraday's law of electromagnetic induction) to be measured by the electrodes 140, 150 provided at the walls encompassing the cavity.

Figure 2:
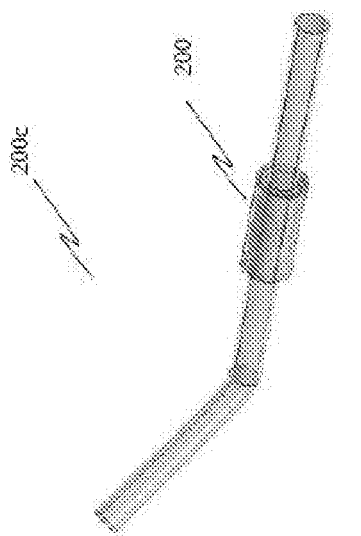
FIG. 2 illustrates the electromagnetic flowmeter installed at various distances from a bend tilted at various angles in all planes
Figure 2:
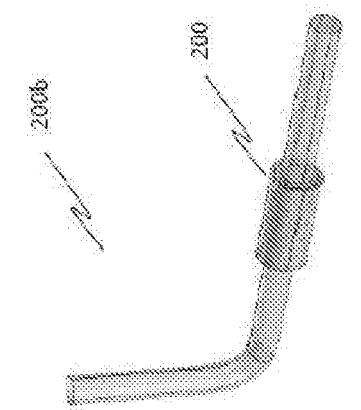
Figure 2:
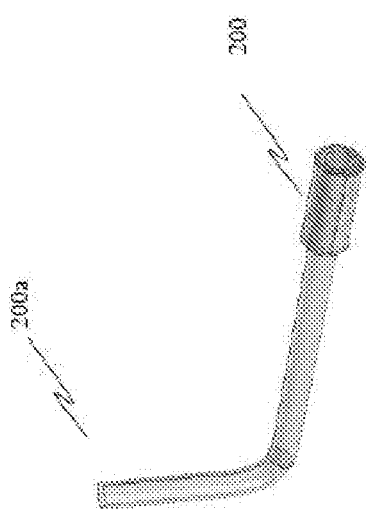

FIG. 2 illustrates the electromagnetic flowmeter 200 installed at various distances from a bend tilted at various angles in all planes. At FIG. 2 in 200a, a bend is shown in a pipe through which fluid passes and the electromagnetic flowmeter 200 installed at a certain distance from the bend. Similarly in 200b, the electromagnetic flowmeter is installed at a different distance from the bend. In 200c the angle of the bend is titled at a different angle in comparison to 200a and 200b. These varying angles and positions of installation of the electromagnetic flowmeter has an impact on the flow profile and a deviation from standard conditions can be expected resulting in erroneous measurements. The current invention caters to such dynamic conditions of installation and provides a correct measurement of the flow rate of the fluid under such conditions.

Figure 3:
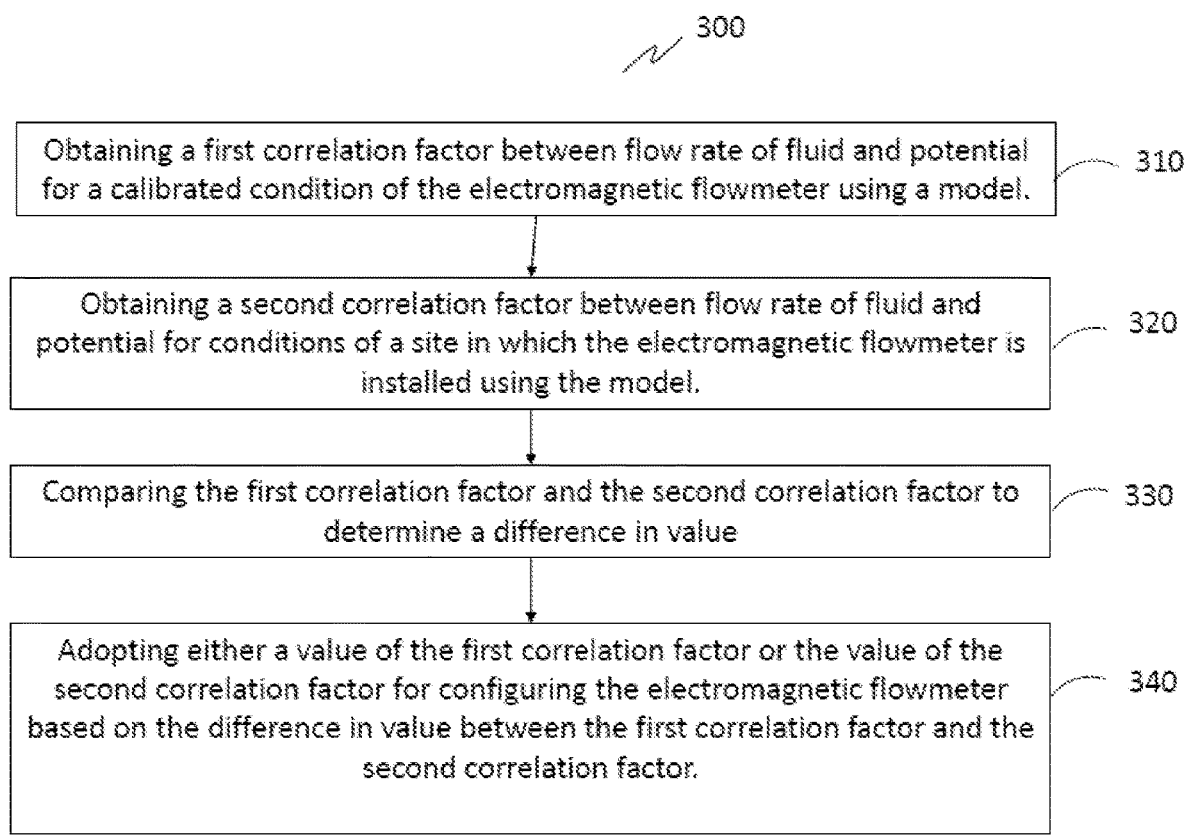
FIG. 3 shows the method of configuring the electromagnetic flowmeter.

FIG. 3 shows the method 300 of configuring the electromagnetic flowmeter. The electromagnetic flowmeter comprises a computing device (not shown) for configuring the electromagnetic flowmeter, coil for generating electromagnetic fields that interact with the fluid passing through the flow pipe, a pair of potential sensing electrodes for measuring electromotive forces generated by the interaction of electromagnetic fields in the fluid. The steps of the method 300 are performed by a computing device which may be located remotely or locally to the electromagnetic flowmeter.

The method 300 comprises the step first step 310 of obtaining a first correlation factor between a value of flow rate of the fluid flowing in the flow pipe and a value of potential generated between a pair of electrodes for the fluid flowing in the flow pipe for a calibrated condition of the electromagnetic flowmeter using a model. The calibrated condition of the electromagnetic flowmeter is obtained assuming condition as set forth in standards for calibration of the electromagnetic flowmeter where the flow is assumed to be as observed in laboratory for calibration experiments. The value of flow rate under calibrated conditions may be assumed as per standardized values known to the person skilled in the art.

In the next step, at 320, a second correlation factor is obtained between a value of flow rate of the fluid flowing in the flow pipe and a value of potential generated between a pair of electrodes for the fluid flowing in the flow pipe of the electromagnetic flowmeter. The second correlation factor is based on conditions of the site in which the electromagnetic flowmeter is installed using the model. The various conditions of the site used as input to the model are for example conditions of the electromagnetic flowmeter like level of current flowing in the coils, no. of turns in the coil, dimensions of electromagnetic flowmeter like size, shape etc., and conditions of the site like orientation of bend, presence of valve, reducers etc. or any obstruction that can cause a disturbance in flow of the fluid either upstream and/or downstream.

As shown in step 330, in this step the first correlation factor and the second correlation factor are compared to determine a difference in value between the first correlation factor and the second correlation factor.

In the subsequent step 340, either a value of the first correlation factor or the value of the second correlation factor is adopted for configuring the electromagnetic flowmeter based on the difference in value between the first correlation factor and the second correlation factor. For example, the value of the second correlation factor will be adopted for configuring the electromagnetic flowmeter if the difference in value between the first correlation factor and the second correlation factor exceeds a pre-set threshold. In other words, if the second correlation factor is different from the first correlation factor, it is evident that the electromagnetic flowmeter will provide an erroneous measurement as the calibration factor or correlation factor has undergone a deviation under the influence of the various conditions of the site. Hence in order to provide a correct value of measurement the second correlation factor replaces the first correlation factor obtained under calibrated conditions for all future measurements by the electromagnetic flowmeter.

The information related to site and all other information that is required to be provided as input to the computing unit may be provided once installation of the electromagnetic flowmeter is done in the site.

Alternately, using the approach, the best site for installing the flowmeter can be determined, and eventually used for the installation.

In an embodiment, the first correlation factor is a based on a measured value of flow rate of the fluid flowing in the flow pipe and a value of potential generated between a pair of electrodes for a calibrated condition (lab condition) of the electromagnetic flowmeter. In another embodiment, first correlation factor is based on an assumed value of flow rate of the fluid flowing in the flow pipe and a value of potential generated between a pair of electrodes for a calibrated condition (lab condition) of the electromagnetic flowmeter.

Figure 4:
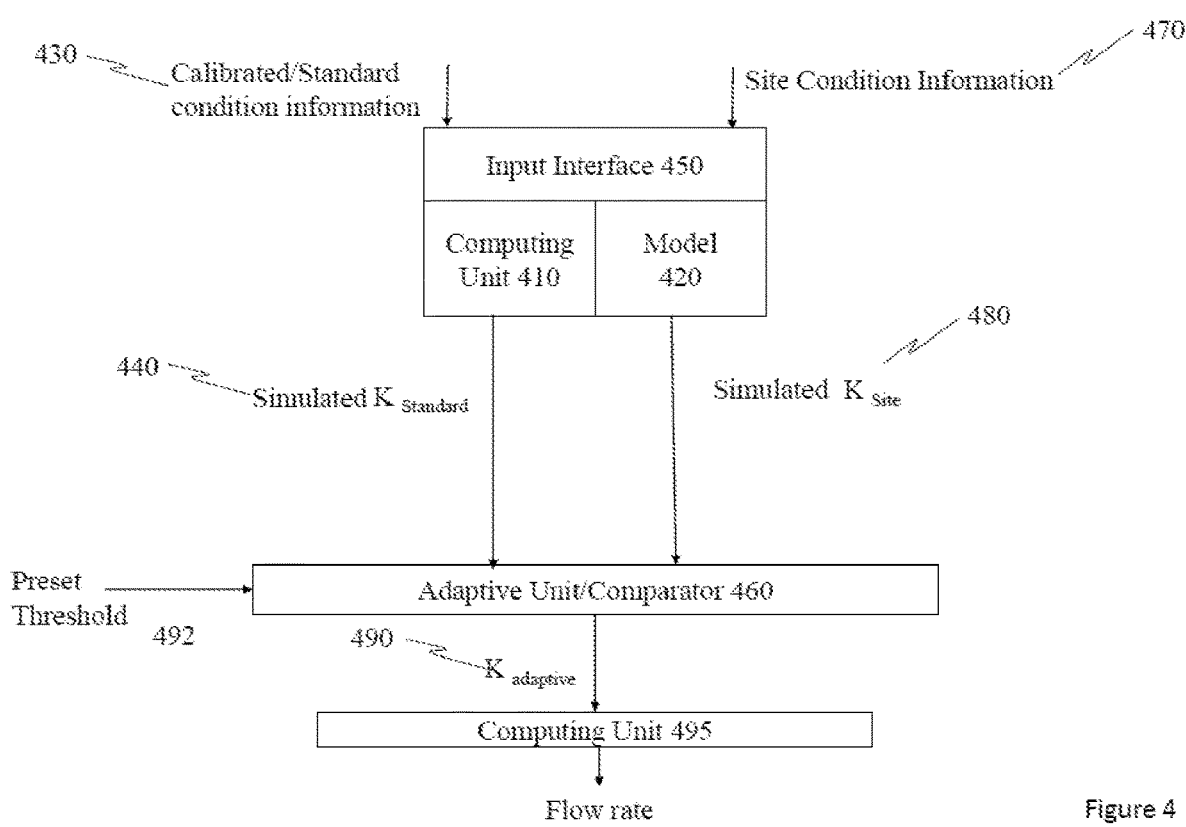
FIG. 4 shows a block diagram representation of the system for configuring the electromagnetic flowmeter.

FIG. 4 shows a block diagram representation of the system for configuring the electromagnetic flowmeter. The system comprises one or more computing units communicatively coupled with the electromagnetic flowmeter and a model of the electromagnetic flowmeter device deployed with one or more computing units. FIG. 4 shows the blocks required to perform the method for configuring the electromagnetic flowmeter. In this block diagram representation, a computing device 410 that runs the model 420 receives calibrated/standard condition information 430 and a simulated value of correlation factor is obtained termed as Simulated $K_{Standard}$ 440. Where Simulated $K_{Standard}$ is a ratio of Flow rate of the fluid passing through the flow pipe and the EMF generated across the potential sensing electrodes of the electromagnetic flowmeter due to interaction of magnetic field with the flowing fluid. This value of correlation factor 440 obtained under a calibrated condition of the electromagnetic flowmeter and as may be known to the person skilled in the art is the baseline calibration factor of the electromagnetic flowmeter. The information may be received via an input interface 450 by the Computing Device 410 that runs the model 420. The output of the Computing Device 410 that runs the model 420 is provided to an Adaptive Unit 460.

Also, the computing device 410 that runs the model 420 receives Site Condition information 470. These site condition information as mentioned earlier are level of current flowing in the coils, no. of turns in the coil, dimensions of electromagnetic flowmeter like size, shape. Also site conditions like orientation of bend, presence of valve, reducers etc. or any obstruction that can cause a disturbance in flow of the fluid either upstream and/or downstream. The Computing Device 410 and Model 420 provide the output of a Simulated $K_{Site}$ 480 to the Adaptive Unit 460. The Adaptive Unit/Comparator 460 adopts one of the values of the correlation factors obtained, that is, either Simulated $K_{Standard}$ or Simulated $K_{Site}$ based on a comparing and determining a difference in value between the two correlation factors. Either of the first correlation factor or second correlation factor is adopted based on a significance of difference in value in comparison to a pre-set threshold 492. The adopted correlation factor $K_{Adaptive}$ 490 is provided to the final computing device 495 of the electromagnetic flowmeter to determine the flow rate.

The flowmeter for exciting the coils for producing electromagnetic fields have a suitable power source and electronics circuitries for making potential difference measurements and display/transmitting the measured values. In an embodiment, the electromagnetic flowmeter can comprise a display for indicating the determined flow of fluid in the flow pipe.

In an embodiment, the electromagnetic flowmeter is Internet of Things (IOT) enabled for providing remote controlling, better visibility of the working of the electromagnetic flowmeter, providing real time information to software systems and other surrounding IOT enabled systems including remote storing and remote analysis of electromagnetic flowmeter. Thereby having the above mentioned configurations for the electromagnetic flowmeter also enabled through remote support.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of configuring an electromagnetic flowmeter for measuring a flow of fluid in a flow pipe, the electromagnetic flowmeter comprising (i) one or more computing devices for configuring the electromagnetic flowmeter, (ii) at least one coil for generating electromagnetic fields that interact with the fluid flowing in the flow pipe, and (iii) a pair of potential sensing electrodes for measuring electromotive forces generated by interaction of electromagnetic fields in the fluid, the method comprising:

obtaining a first correlation factor between a value of flow rate of the fluid flowing in the flow pipe and a value of potential generated between the pair of potential sensing electrodes from the fluid flowing in the flow pipe for a calibrated condition of the electromagnetic flowmeter, using a model;

obtaining a second correlation factor between a value of flow rate of the fluid flowing in the flow pipe and a value of potential generated between the pair of potential sensing electrodes from the fluid flowing in the flow pipe based on one or more conditions of a site in which the electromagnetic flowmeter is installed, using the model;

comparing the first correlation factor and the second correlation factor to determine a difference in value between the first correlation factor and the second correlation factor; and adopting at least one of the value of the first correlation factor or the value of the second correlation factor for configuring the electromagnetic flowmeter based on the difference in value between the first correlation factor and the second correlation factor.

2. The method as claimed in claim 1, wherein the difference in value is compared to a pre-set threshold for adopting at least one of the value of the first correlation factor or the value of the second correlation factor.

3. The method as claimed in claim 1, wherein the one or more conditions of the site are at least one of a level of current flowing in the at least one coil, a number of turns in the coil, one or more dimensions of the electromagnetic flowmeter, an orientation of a bend, a presence of a valve, a presence of reducers, and a presence of an obstruction to the flow of fluid.

4. The method as claimed in claim 1, wherein the first correlation factor is based on an assumed value of flow rate of the fluid flowing in the flow pipe and a value of potential generated between the pair of potential sensing electrodes for the calibrated condition of the electromagnetic flowmeter.

5. The method as claimed in claim 1, wherein the first correlation factor is based on a measured value of flow rate of the fluid flowing in the flow pipe and a value of potential generated between the pair of potential sensing electrodes for the calibrated condition of the electromagnetic flowmeter.

6. The method as claimed in claim 2, wherein the pre-set threshold is equal to zero.

7. A system for configuring an electromagnetic flowmeter, the system comprising:

one or more computing units communicatively coupled with the electromagnetic flowmeter, the one or more computing units configured to:

use a model of the electromagnetic flowmeter device to (i) compute a first correlation factor relating a value of flow rate of fluid to a value of potential difference generated between electrodes in the model of the electromagnetic flowmeter, using condition information used during calibration of the electromagnetic flowmeter, and (ii) a second correlation factor relating a value of flow rate of fluid to a value of potential difference generated between electrodes in the model of the electromagnetic flowmeter, using one or more conditions of an installation site of the electromagnetic flowmeter; and adopt one of the first correlation factor and the second correlation factor based on a magnitude of a difference between the first correlation factor and the second correlation factor, to configure the electromagnetic flowmeter.

8. The system as claimed in claim 7, wherein the one or more computing units are located within the electromagnetic flowmeter device.

9. The system as claimed in claim 7, wherein the one or more computing units are located remote to the electromagnetic flowmeter device.

10. The system as claimed in claim 7, wherein the one or more computing units comprise at least one comparator for comparing the magnitude of the difference between the first correlation factor and the second correlation factor to a pre-set threshold.

* * * * *